Dec. 8, 1970     L. O. HEWKO     3,545,830

HIGH SPEED ROLLER BEARING WITH EPICYCLIC CAGE PRELOAD

Filed March 14, 1969

INVENTOR.
Lubomyr O. Hewko
BY
C. L. Engle
ATTORNEY

United States Patent Office
3,545,830
Patented Dec. 8, 1970

1

3,545,830
HIGH SPEED ROLLER BEARING WITH
EPICYCLIC CAGE PRELOAD
Lubomyr O. Hewko, Port Clinton, Ohio, assignor to
General Motors Corporation, Detroit, Mich., a corporation of Delaware
Filed Mar. 14, 1969, Ser. No. 807,296
Int. Cl. F16c 19/00
U.S. Cl. 308—202                             4 Claims

ABSTRACT OF THE DISCLOSURE

A high speed roller bearing assembly including an elastic ring to bias cage supported rollers into continual rolling contact with the bearing inner race. The elastic ring preloads the cage supported roller members into engagement with the inner race with a predetermined force and is configured to contact preferably three equally circumferentially spaced rollers. In a static condition the elastic ring is noncircular in form and its initial rotation is imparted to the bearing assembly. The ring rotates slower than the cage in an epicyclic fashion. This epicyclic rotation ensures sufficient preload so that a pure rolling contact between the rollers and the inner race exists during all stages of operation. As bearing speed increases, the elastic ring tends to assume a circular form due to the centrifugal forces which in turn produces a radially inward reaction force on the three rollers engaged by the elastic ring to provide a substantially constant preloading force.

---

This invention relates to a preload roller bearing assembly and more particularly to such an assembly incorporating an elastic ring to provide a preload force.

The tendency of cylindrical roller bearings to skid during high speed operation has been a problem in the bearing art for some time. This skidding is caused by the loss of preload and subsequent reduction of driving torque available at the inner race contact surface. The occurrence of such skidding also causes the cage speed to decrease, a smearing of rolling surfaces, excessive cage wear, and frequently results in the generation of undesirable temperatures effecting the wearability of the contacting surfaces. It is therefore a purpose of this invention to eliminate the above described problem by incorporating an elastic ring member within the bearing assembly whereby a desirable preload force is continually applied against the roller members urging them into rolling engagement with the bearing inner race. Since the bearing art is a highly competitive industry, it is necessary that any modification providing a new result be economically feasible. The incorporation of an elastic ring to continually preload the roller members, as illustrated in the following specification, requires only slight changes while continuing to utilize conventional parts.

Among the objects of this invention is the provision of a roller bearing assembly including an elastic ring positioned to bias the rollers into engagement with a bearing inner race.

Another object of this invention is the provision of an elastic ring engaging three equally circumferentially spaced rollers to provide a desired preload force thereon.

A further object of this invention is the provision of an elastic ring positioned to bias roller members into engagement with an inner race member wherein the ring assumes a noncircular form in a static condition and tends to assume a circular form and invert centrifugal forces thereby applying an increased preload upon the roller members as operational speed increases.

A still further object of this invention is the provision of an elastic ring engaging strategic roller members in a

2 roller bearing assembly which rotates relative to a bearing cage member at a slower speed in an epicyclic manner whereby the centrifugal forces are converted to apply a predetermined preload force to the roller members.

Figure 1:
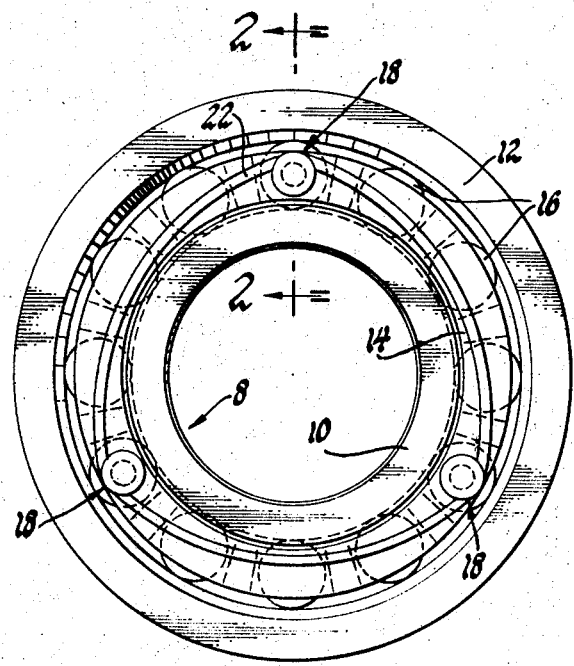
FIG. 1 is a side elevational view of a roller bearing assembly illustrating the static position of an elastic ring member which is the subject of this invention.
Figure 2:
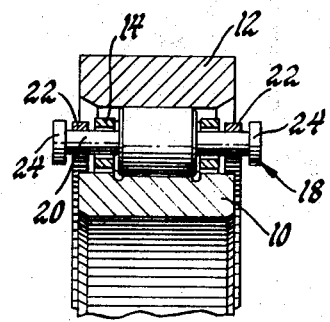
FIG. 2 is a cross-sectional view of FIG. 1 taken on line 2—2.

With reference now to FIG. 1, the roller bearing assembly 8 includes and inner race 10 and an outer race 12 with a cage 14 supporting a plurality of rollers 16 therebetween. Three modified rollers 18 include axially extending trunnions 20 at each end thereof as shown in FIG. 2. A continuous prestressed elastic ring 22 of bearing steel is placed upon the trunnions 20 and is retained thereon by flanges 24. The modified rollers 18 are spaced circumferentially 120° apart equal in the circumference of the cage and the elastic ring 22 assumes a somewhat triangular form shown in FIG. 1 in a static condition.

Figure 4:
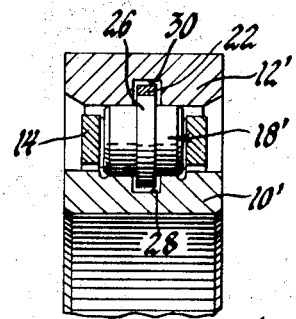
FIG. 4 is a partial cross-sectional view illustrating another embodiment of the subject invention wherein an elastic rings engages raised central portions of modified rollers.

FIG. 4 illustrates another form of modified rollers 18' which comprise a centrally disposed annular flange 26 that is received within an annular groove 28 in a like modified inner race member 10'. The outer race 12' is also machined to include a groove 30 which receives the annular flange 26 with the elastic ring 22 mounted thereon.

Figure 5:
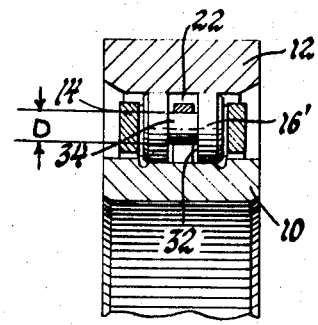
FIG. 5 is a partial cross-sectional view illustrating a further embodiment of the subject invention wherein the rollers of the bearing assembly are modified to contain grooves receiving an elastic ring.

A still further modification of the invention is illustrated in FIG. 5 in which the conventional inner race member 10 and outer race member 12 receive roller members 16' having a centrally located groove 32 machined therein. Three of the rollers 16' have a central reduced portion 34 of a larger diameter D than the remaining rollers receiving an elastic ring 22 to bias these rollers into engagement with inner race 10 in a static condition.

Figure 3:
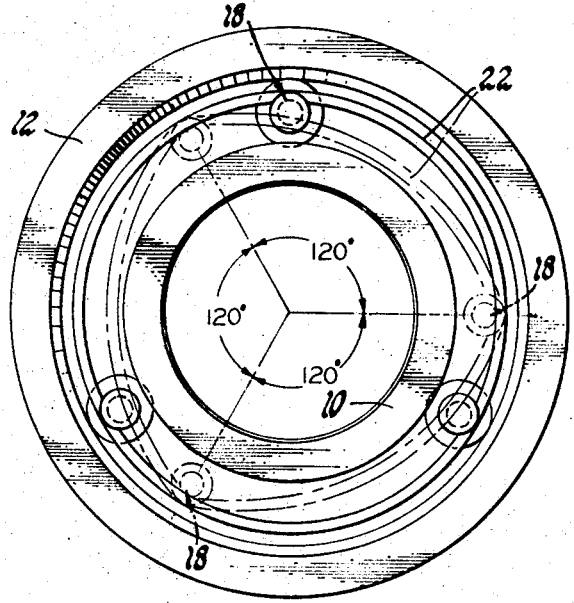
FIG. 3 is a partly schematic side elevational view of the roller bearing assembly illustrating the elastic ring in its kinetic position in solid lines and its static position in broken lines.

In operation, with particular reference to FIG. 1, the modified rollers 18 are biased into engagement with inner race 10 with a predetermined force by elastic ring 22. Initial rotation of the bearing assembly results in the cage 14 and ring 22 planetating with respect to the race members 10 and 12 whereby the elastic ring 22 applies a sufficient preload to assure rolling contact between the rollers and inner race 10. As the speed of the bearing assembly increaes, the elastic ring 22 tends to assume a more circular form, illustrated in FIG. 3, and while doing so inverts the centrifugal forces upon the modified rollers 18 and forces them radially inward, thus increasing the preload between the rollers and the inner race as the speed increases. This inverted centrifugal force varies as a square function of speed and by suitable selection of ring mass it is possible to completely offset the centrifugal force acting on the rollers and maintain a constant preload on the selected rollers thereby guaranteeing rolling contact between the rollers and the inner race surface during all speed ranges of the bearing assembly.

To accomplish this result it is desirable to construct the elastic ring 22 from high quality bearing steels which are through hardened or carburized and hardened on the inside diameter to a Rockwell C 62–64 hardness. By providing such a material, failure of the bearing assembly due to premature wear of the elastic ring 22 is prevented. It is obvious that the material, size, and shape and more specifically the mass of ring 22 will vary with the size of the roller bearing assembly and the operating speeds expected to be encountered thereby. The single limitation for successful operation of this inventive structure is that the ring mass 22 must be configured and made from a material to provide a sufficient static preload which when added to the inverted centrifugal ring action will be greater than the normal centrifugal force on the rollers.

The above detailed description is intended for purposes of illustration only, it being readily apparent that any number of modified rollers could be included in a particular bearing assembly to receive the elastic ring 22 and that the specific rollers 18 could be modified in various forms to receive the ring, the major limitation being that the rollers 18 should not be modified to restrict endurance of the bearing assembly.

I claim:

1. In a roller bearing assembly including inner and outer race members, a plurality of rollers, a cage member rotatably supporting said rollers between said race members, the improvement comprising: an elastically noncircularly distored ring on at least three engaging surfaces of said rollers that do not engage said race members whereby said rollers are preloaded into engagement with said inner race member such that said rollers rotate on said inner race while said ring rotates relative to said cage member and tends to assume a more circular shape as the bearing speed increases thereby maintaining a substantially constant preload on said rollers toward said inner race assuring rolling contact between said rollers and said inner race during all speed ranges of said bearing assembly.

2. In a roller bearing assembly including inner and outer race members, a plurality of rollers, a cage rotatably supporting said rollers between said race members, the improvement comprising: an elastic ring capable of a predetermined degree of distortion, a raised flange formed on at least three of said rollers, said flange receiving said elastic ring in a noncircular distorted form when in a static condition, and circumferential grooves formed in the bearing surfaces of said race members receiving said raised flange and said elastic ring whereby said rollers are preloaded into engagement with said inner race member and as the bearing speed increases said elastic ring tending to assume a circular form maintaining a substantially constant preload of said rollers on said inner race through inversion of the generated centrifugal forces.

3. In a roller bearing assembly including inner and outer race members, a plurality of rollers, a cage member rotatably supporting said rollers between said race members, the improvement comprising: central grooves formed in said rollers, and a prestressed elastic ring positioned in said grooves and having a diameter sufficient to urge said rollers into engagement with said inner race member, said ring comprising a predetermined elastic strength sufficient to urge said rollers into engagement with said inner race at relatively high speeds so that said rollers continually engage said inner race with a rolling movement.

4. In a roller bearing assembly including inner and outer race members, a plurality of rollers, a cage member rotatably supporting said rollers between said race members, the improvement comprising: trunnion members at each end of at least two of said rollers, and an elastically noncircularly distorted ring positioned upon each of said trunnions, said ring having a diameter less than a circumscribed circumferential tangent to said rollers whereby said trunnioned rollers are preloaded into engagement with said inner race member and as the bearing speed increases said ring tends to become circular in form and applies a preload to all of said rollers so that rolling engagement upon said inner race member is maintained.

References Cited

UNITED STATES PATENTS 586,535   7/1897   Vinton _____ 308—209

FRED C. MATTERN, JR., Primary Examiner

F. SUSKO, Assistant Examiner